United States Patent [19]

Kaveh et al.

[11] Patent Number: 5,758,680

[45] Date of Patent: Jun. 2, 1998

[54] METHOD AND APPARATUS FOR PRESSURE CONTROL IN VACUUM PROCESSORS

[75] Inventors: Farro Frank Kaveh, Mountain View; Michael S. Barnes, San Francisco; Brett C. Richardson, San Ramon; Christopher H. Olson, El Dorado, all of Calif.

[73] Assignee: Lam Research Corporation, Fremont, Calif.

[21] Appl. No.: 627,712

[22] Filed: Mar. 29, 1996

[51] Int. Cl.⁶ .............. F17D 1/16; F17D 1/18; F16K 17/34

[52] U.S. Cl. .......... 137/14; 137/487.5; 137/114; 437/7; 216/59; 156/345; 118/710; 118/692

[58] Field of Search .......... 437/7; 216/59; 156/345; 118/710, 692, 715; 137/487.5, 14, 114

[56] References Cited

U.S. PATENT DOCUMENTS

| | | | |
|---|---|---|---|
| 4,253,480 | 3/1981 | Kessel et al. | 137/102 |
| 4,394,871 | 7/1983 | Czajka et al. | 137/102 |
| 4,702,273 | 10/1987 | Allen, Jr. et al. | 137/487.5 |
| 4,798,521 | 1/1989 | Schmidt et al. | 137/487.5 |
| 4,949,670 | 8/1990 | Krogh | 118/692 |
| 4,961,441 | 10/1990 | Salter | 137/487.5 |
| 5,020,176 | 6/1991 | Datson | 137/487.5 |
| 5,020,564 | 6/1991 | Thoman et al. | 137/102 |
| 5,031,674 | 7/1991 | Mack | 137/487.5 |
| 5,220,940 | 6/1993 | Palmer | 137/487.5 |
| 5,292,370 | 3/1994 | Tsai et al. | 118/715 |
| 5,365,772 | 11/1994 | Ueda et al. | 118/715 |
| 5,534,069 | 7/1996 | Kuwabara et al. | 118/715 |

Primary Examiner—Denise L. Ferensic
Assistant Examiner—Joanne Y. Kim
Attorney, Agent, or Firm—Pennie & Edmonds LLP

[57] ABSTRACT

A method and apparatus is disclosed for controlling the pressure of reaction chamber in wafer processing equipment. The disclosed apparatus and method uses a ballast port for inserting gas into the evacuation system, thereby controlling the pressure in the reaction chamber. The disclosed apparatus and method further uses estimation curves to estimate the desired position of a controlled gate valve which is located between the reaction chamber and turbo pump. The disclosed apparatus and method further introduces process gases at higher rate than set point levels to reduce the transition time or stabilization time required when raising the pressure in the reaction chamber.

21 Claims, 5 Drawing Sheets

METHOD AND APPARATUS FOR PRESSURE CONTROL IN VACUUM PROCESSORS

BACKGROUND OF THE INVENTION

1. Field of the Invention

This invention relates to the field of semiconductor wafer processing, and in particular to a method and apparatus for controlling the reaction chamber pressure in semiconductor wafer processing equipment.

2. Description of the Related Art

Fully automated wafer processing systems are currently in widespread commercial use. In such systems, wafers are robotically transported into and out of a reaction chamber or process chamber where, under a controlled evacuated environment, various processes are carried out. One example of such a wafer processing system is the TCP™ 9400 single-wafer plasma etching system manufactured by Lam Research Corporation.

In the case of plasma etching, semiconductor wafers are etched in the reaction chamber by exposing the wafer to ionized gas compounds (plasma) under very low pressures. Typically, during processing, pressures below one Torr need to be maintained in the reaction chamber. Process recipes consist of a series of steps controlling gas flow rates, chamber pressure, RF power, gap spacing, chamber temperature, and wafer temperature. Preprogrammed sets of process recipes are typically provided from the manufacturer. The operator may either select a programmed recipe or use an altered or customized recipe.

When the etching process starts, selected gases used for processing are mixed and introduced into the reaction chamber at rates according to the process recipe. RF power is delivered by a coil in the upper part of the reaction chamber and is tuned so as to ionize the process gases. RF power is also delivered to the wafer and is tuned so as to induce a DC bias on the wafer thereby controlling the direction and energy of ion bombardment of the wafer. During the etching process, the plasma reacts chemically with the wafer surface to remove material not covered by a mask. The plasma and RF electrical field are completely contained within the reaction chamber. An evacuation system continuously removes gases from the reaction chamber, and thereby maintains the desired pressure. The evacuation system typically comprises a turbo pump separated from the reaction chamber by a control gate valve. A pressure controller uses pressure data from a manometer in the reaction chamber to adjust the position of the control gate valve. The pressure controller opens and closes the gate valve to increase and decrease the vacuum supplied from the turbo pump to the reaction chamber. In this way, the pressure controller attempts to maintain the desired pressure in the reaction chamber as the gas flow rates into the reaction chamber vary from one process step to the next.

The pressure controller compares the data from the reaction chamber manometer with the set point values programmed in the recipe. If either the process gas flow rate, or the desired pressure in the reaction chamber changes greatly from one process step to the next, the pressure controller may not be able to adjust the gate valve position appropriately. For example, if the next process step requires the gas to be introduced at much higher flow rates, the gate valve may initially over or under compensate, resulting in the wrong pressure in the reaction chamber at the beginning of the step. To alleviate this problem, currently available systems perform a learn procedure each time a new recipe is used. The learn procedure creates a table of the approximate gate valve positions required for each process step in the new recipe. During the learn procedure, dummy wafers are processed according to the process steps of the recipe, and the controller notes the gate valve positions required for each step.

One problem with the current systems is that a new learn procedure is required every time a new process step is used on a machine. Thus, when the operator alters the recipe by changing the set point pressure or gas flow of one of the process steps, he necessarily incurs the time and expense of deriving a new table. Running new learn procedures can be particularly time consuming when experimenting with new recipes.

Another problem with the current systems is that the results from the learn procedure will be invalid if any of the gas supply valves or instruments are incorrectly tuned or calibrated. For example, if one of the gas inflow valves is incorrectly calibrated during the learn procedure, the resulting table of gate positions will also be incorrect. Furthermore, the error in the table may not be detected until several wafers are incorrectly processed.

Another problem with the currently available systems is related to the movement of the gate valve itself. During processing, a certain amount of waste material generated from the etching process collects on the surface of the gate valve. Whenever the gate valve position is changed, particulate matter is released in the surrounding environment. Due to the extremely low operating pressures, back diffusion may carry the particles back upstream to the reaction chamber, where undesirable contamination of the wafer may occur.

A further limitation with the current systems is that the transition time or stabilization time may sometimes be undesirably long. The transition or stabilization time is the time required to stabilize the pressure in the reaction chamber to the pressure set point for a processing step. In particular, when the chamber starts out at relatively low pressure, such as at the beginning of processing, and the next step requires a relatively high pressure, such as 80 mTorr, the stabilization time typically takes around 20 seconds depending on the set point gas flow. According to the current practice, chamber stabilization is achieved by introducing the process gases into the reaction chamber at the set point flow rates required by the next processing step. Thus, in cases where the next processing step requires a relatively low flow, and the chamber pressure must be increased substantially, the stabilization time is often undesirably long.

SUMMARY OF THE INVENTION

Thus, it is an object of this invention to improve the present technique of pressure control in the field of wafer processing by minimizing the movement required by the gate valve during processing, thereby minimizing the amount of particulate waste material introduced into the reaction chamber.

It is a further object of this invention to improve the present technique of pressure control in the field of wafer processing by eliminating the need for performing a learn procedure whenever the set point pressure or gas flow rates are substantially changed for a particular process step or whenever a new recipe is used.

It is a further object of this invention to improve the present technique of pressure control in the field of wafer processing by significantly reducing the stabilization or transition time required for certain process steps having a set point pressure significantly higher than that of the previous step.

In order to meet these objectives, the present invention is directed to a method and apparatus wherein the pressure in the processing chamber is controlled by introducing a ballast gas into the evacuation system and the flow rate of ballast gas is adjusted according to the measured pressure in the processing chamber.

Also in order to meet these objectives, the present invention is directed to a method and apparatus wherein the set point pressure and process gas flow are retrieved for a particular process step and the gate valve position is estimated by referencing gate valve position estimation curves stored in memory which correlate chamber pressures, gas flows, and gate valve positions.

Also in order to meet these objective, the present invention is directed to a method for raising the pressure in the processing chamber to the set point level wherein the process gas is initially introduced at a first predetermined flow rate which is higher than the set point flow rate, and after a predetermined amount of time or upon sensing of the pressure of the processing chamber approaching the set point level, the gas introduction rate is re-set to the set point level.

DETAILED DESCRIPTION OF THE INVENTION

Figure 1:
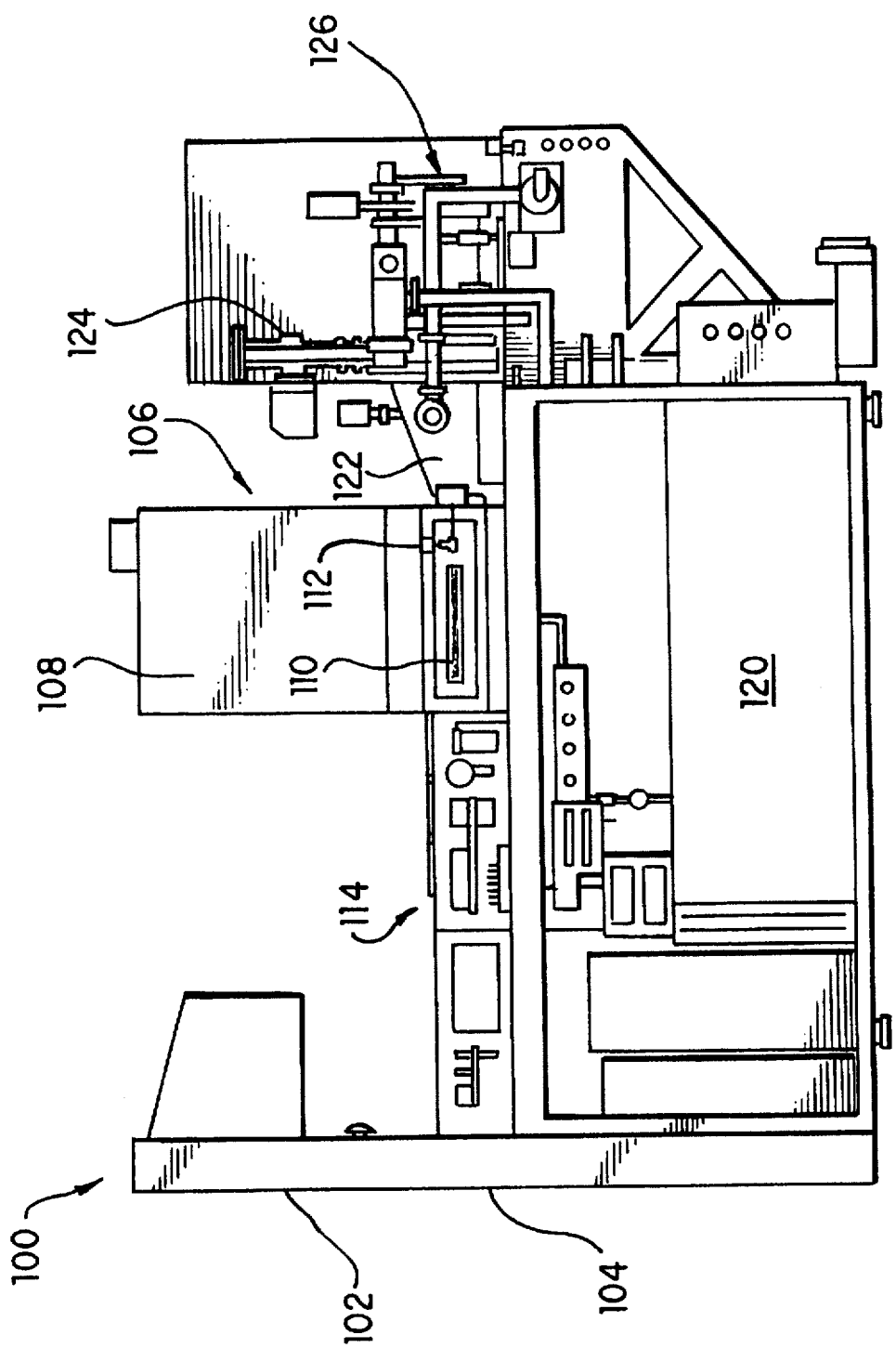
FIG. 1 is a right side view showing some of the major assemblies of a wafer processing machine according to the present invention.

The following embodiments of the present invention will be described in the context of an automated single-wafer plasma etching system, although those skilled in the art will recognize that the disclosed methods and structures are readily adaptable for broader application. For example, the invention is readily adaptable to other types of wafer processing equipment and vacuum processing equipment. Note that whenever the same reference numeral is repeated with respect to different figures, it refers to the corresponding structure in each such figure.

A plasma etching system 100 is illustrated in FIG. 1, according to the present invention. It should be noted that the present invention is illustrated by way of example in FIGS. 1-2 as used with the TCP™ 9400 single-wafer plasma etching system manufactured by Lam Research Corporation. Based on the teaching set forth herein, a person of ordinary skill may readily utilize the present invention with any suitable vacuum or wafer processing equipment which requires control and manipulation of processing pressures in an evacuated environment.

As shown in FIG. 1, etching system 100 comprises an operator interface and control panel 102, from which the operators monitor and control the various processes and features of the etching system. Sender and receiver wafer indexers 104 send and receive wafers to and from the other processing assemblies in etching system 100. In the case of the TCP™ 9400, the wafers are robotically transported from the send indexer along the left side of the etching system to an entrance loadlock (not shown). From the entrance loadlock, wafers are placed into the reaction chamber 106, where the plasma etching process takes place. Shown in FIG. 1 is the upper chamber housing 108, quartz window 110, and chamber manometer 112. After processing, the wafers enter the exit loadlock 114, and are transported back to indexers 104. Also shown in FIG. 1 are gas box 120, plenum 122, gate valve 124, and turbo pump 126, all of which will be described in greater detail below.

Figure 2:
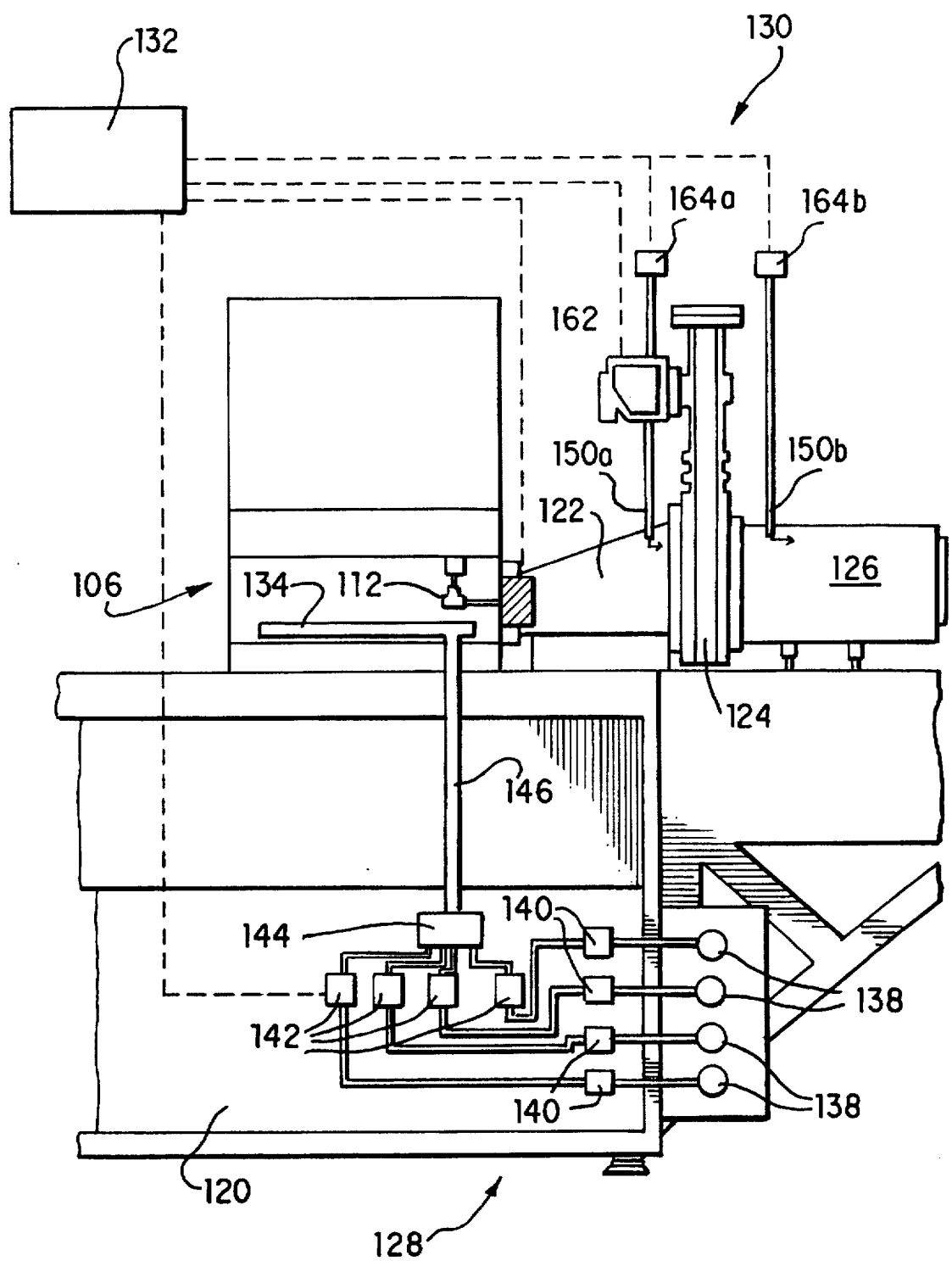
FIG. 2 is a schematic depicting a gas delivery system, reaction chamber, and evacuation system of a wafer processing machine according to the present invention.

FIG. 2 illustrates, in schematic form, reaction chamber 106, gas delivery system 128, exhaust system 130, and control system 132. During the etching process, a wafer is placed or clamped on a lower electrode assembly within reaction chamber 106. To maintain a controlled wafer-etch environment, reaction chamber 106 is kept under vacuum at all times except during maintenance. Exhaust system 130 serves to maintain this vacuum by evacuating gas from the reaction chamber.

Gas delivery system 128 introduces process gasses into reaction chamber 106 through a gas ring 134, which comprises a plurality of gas outlets arranged in a ring about the lower electrode assembly and the wafer. Gas delivery system 128 is under the control of control system 132. Gas delivery system 128 supplies process gases to the reaction chamber via multiple gas flow paths which comprise manual shut-off valves 138, primary shut-off valves 140, mass-flow controllers 142, gas-mixing manifold 144. Although shown in FIG. 2 are four separate gas flow paths, in general any number of gas flow paths may be used according to the needs of a particular application. From gas-mixing manifold 144, the process gases pass through process gas line 146 and then into reaction chamber 106 via gas ring 134.

Control system 132 directs gas panel interface 136 to open and close the mass-flow controllers 142 to regulate the flow of gases to the gas-mixing manifold 144. According to currently available systems, during a stabilization step or a transition between two steps requiring an increase in set point pressure, the control system would direct the mass flow controllers to simply set the flow of gases to the flow rate required by the next step. However, according to the present invention it has been found that the speed of response is a strong function of the gas inflow rate. Thus, the stabilization time or transition time may advantageously be reduced by initially directing the mass-flow controllers to flow rates much greater than may be required for the next etching step. Furthermore, it has been found that this increased gas flow rate during stabilization has minimal detrimental effect on the process, because the RF power is not being used during the stabilization step.

Figure 3:
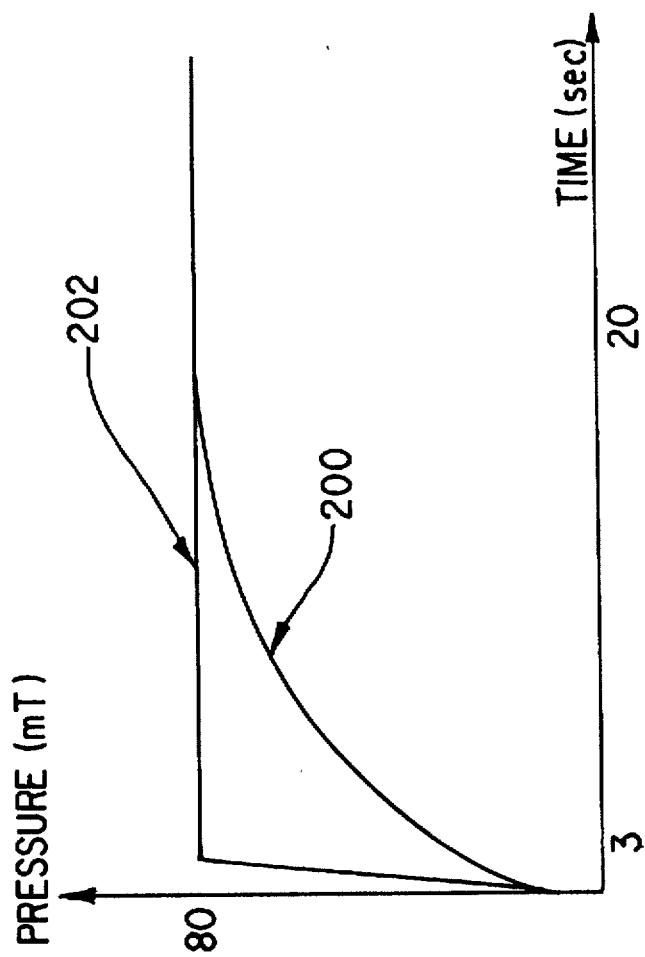
FIG. 3 is a graph illustrating examples of stabilization times under prior art methods and according to the present invention.

According to the present invention, the higher the gas flow rate during stabilization, the shorter the stabilization time. FIG. 3 shows examples of curves which illustrate the stabilization or transition time under the prior art method, 200, and the method according to the present invention, 202. In the example of FIG. 3, the reaction chamber needs to be raised from only a few mTorr to a process step requiring 80 mTorr pressure and a set point flow rate of 40 SCCM. Using conventional methods, as shown in curve 200, the gas is simply introduced at the set point of 40 SCCM, and the stabilization time is approximately 20 seconds. Using the method and apparatus according to the present invention, as shown in curve 202, introducing the process gas during stabilization initially at a rate of 320 SCCM results in a stabilization time of only about 3 seconds. Such a decrease in stabilization time translates into a substantial increase in throughput.

Other rates of introduction may be used depending on the process requirements and the resulting benefit of increased throughput. In general the stabilization time multiplied by the flow rate will be directly proportional to the change in pressure. Using this relationship, for a desired increase in pressure, an appropriate flow rate may be chosen to decrease the stabilization time.

Figure 4:
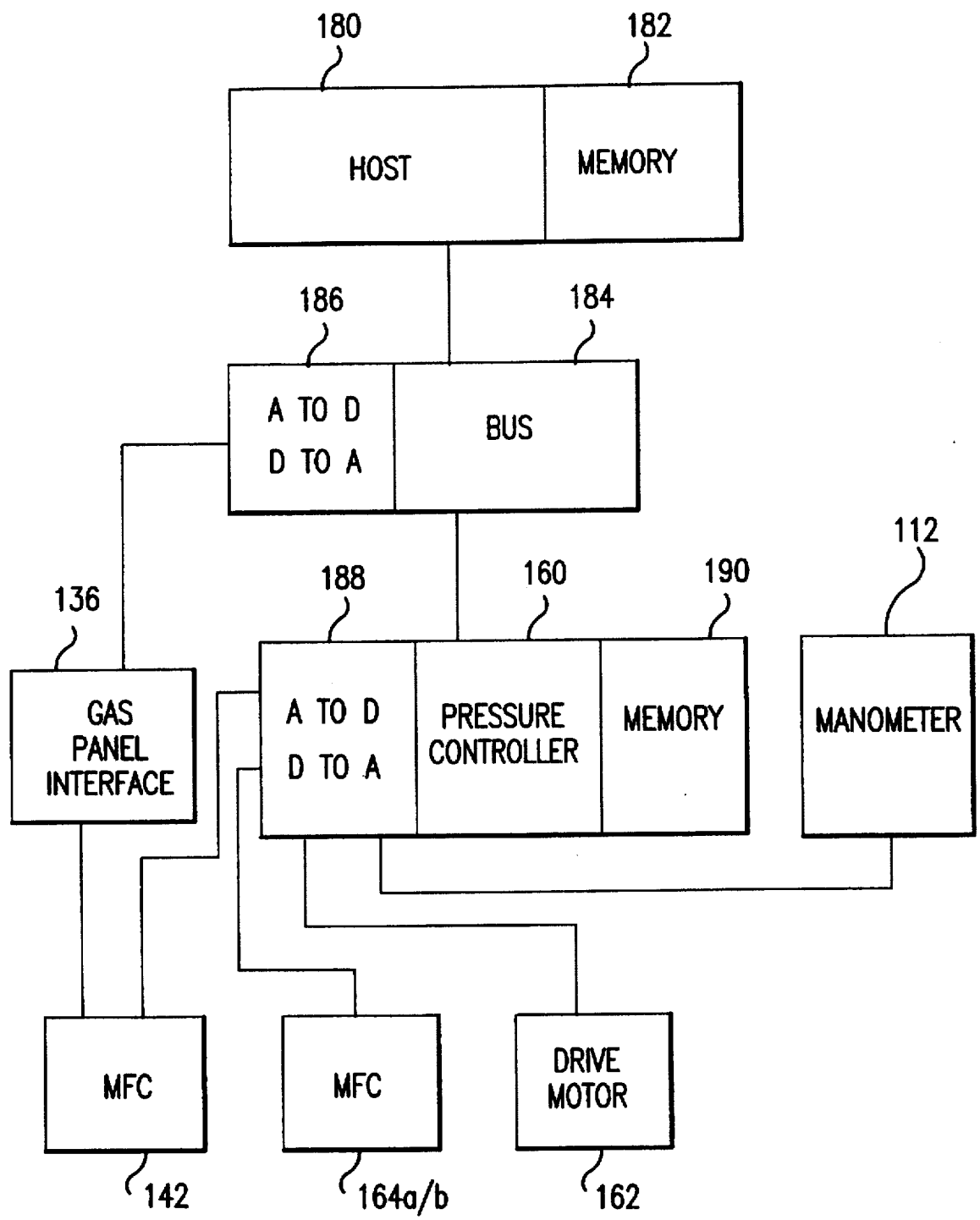
FIG. 4 is block diagram illustrating some components of a control system and various interconnections between such components according to the present invention.

Referring now to FIG. 4, a block diagram of control system 132 is illustrated, which comprises host computer 180, bus 184, gas panel interface 136 and pressure controller 160. Host computer 180 is connected to a memory 182, which typically stores the process recipes in the form of a table of process steps, and the corresponding chamber pressures, process gas flow rates, RF power settings, gap spacings, and temperature settings for each process step. Bus 184 typically comprises a standard bus, such as VMEbus, which communicates with the host 180 via a local area network such as ethernet. Gas panel interface 136 communicates with the bus 184 typically via analog lines and D to A and A to D converters residing on bus 184. Through gas panel interface 136 and bus 184, host 180 may set flow rates and read flow settings to and from mass flow controllers 142. However, according to the present invention, mass flow controllers 142 are also controllable by pressure controller 160 via converters 188. Pressure controller 160 communicates with the bus 184 via RS232 connection or the like. Pressure controller 160 receives pressure readings from manometer 112, controls gate valve drive motor 162, and controls ballast gas mass flow controller 164a or 164b (explained in more detail below).

According to the present invention, the increased inflow of process gas into the reaction chamber may be controlled by either pressure controller 160 or by host 180. In the case where pressure controller 160 controls the inflow of process gas, pressure controller 160 sets the inflow to a high flow rate and monitors the pressure in reaction chamber 106 through chamber manometer 112. When the pressure in reaction chamber 106 comes within some range of the pressure required for the following process step, pressure controller 160 re-sets mass flow controllers 142 to introduce gas at the set point rate of the following process step. A suitable threshold pressure for re-setting the flow rates to the set point flow rate should be chosen for each particular configuration of equipment so that smooth coasting to the set point pressure is obtained. For example, it has been found on some machines that when the pressure is within about 10% of the set point pressure, the flow rate should be re-set to the set point flow rate.

Alternatively, the host 810 may control the gas inflow rates via gas panel interface 136. When controlled from the host, the process gas is introduced at a high rate for a time t, after which the flow rates are re-set to the set point levels. It has been found that the proper time t, for changing the flow rate from the high level to the set point level, can be established through experiment, by running a dummy wafer through once and monitoring the time required to reach the set point pressure. The time t, may also be calculated by using a relationship that has been established through simple modeling of the chamber, as shown below:

$$P = alpha * mdot * t \to t = P/(alpha * mdot)$$

The value of alpha varies with the particular configuration of equipment; a value of approximately 0.3 has been found for an experimental machine manufactured by Lam Research Corporation.

Thus, according to the present invention, the stabilization time and the transition time during pressure step changes may be significantly shortened, thereby making the process more efficient and increasing throughput.

Referring again to FIG. 2, the evacuation system 130 will be described in greater detail. The evacuation system 130 serves to create a vacuum in the reaction chamber 106. Evacuation system 130 comprises plenum 122, gate valve 124, turbo pump 126, and ballast ports 150a and 150b. As shown in FIG. 2, plenum 122 communicates directly with reaction chamber 106. Between plenum 122 and turbo pump 126 is gate valve 124. Note that although valve 124 is shown and referred to as a gate valve, those of ordinary skill in the art will recognize that many alternative types of valves may be used which have a throttling effect on the flow of gas between the process chamber and the vacuum pump. Such valves include, for example, butterfly valves, vane-type valves, louvered-type valves, and iris-type valves.

Additionally, the evacuation system 130 may also comprise a backing pump (not shown) which is used to initially pump down reaction chamber 106 from atmospheric pressure to a rough vacuum pressure of about 1 mTorr. Control system 132 coordinates opening and closing isolation valves that connect each pump to the chamber so that turbo pump 126 continues to reduce pressure when the backing pump reaches its low pressure limit. Once the backing pump has pumped down the chamber to its low-pressure limit, turbo pump 126 is engaged to reduce the chamber pressure to less than 1 mTorr.

In currently available systems, pressure controller 160 uses pressure data from chamber manometer 112 to open and close the gate valve 124 in order to control the pressure in reaction chamber 106. However, according to the present invention, it has been found that the pressure in reaction chamber 106 may also be controlled by introducing a ballast gas into the turbo pump through the ballast port. In FIG. 2, ballast port 150a and ballast port 150b illustrate two alternative placements of a ballast port. Ballast port 150a is placed immediately upstream from gate valve 124; ballast port 150b is positioned downstream from gate valve 124 and inserts ballast gas directly into turbo pump 126. It is preferred that the placement of the ballast port be generally as far downstream as possible, to reduce the possibility of ballast gas back diffusing into the reaction chamber and interfering with the process. In the case of ballast port 150b, the ballast gas may preferably be forced directly into one of the stages of the turbo pump, thereby greatly reducing the possibility of back diffusion. It is also preferable to use as a ballast gas a neutral gas such as nitrogen which may also be used for other purposes in the system operation or maintenance.

The flow rate of the ballast gas is preferably controlled by a mass flow controller, under the direction of control system 132. Mass flow controllers 164a and 164b control the flow rate of ballast gas for ballast ports 150a and 150b respectively. As shown in FIG. 4, mass flow controllers 164a and 164b are controlled by pressure controller 160.

The introduction of ballast gas through the ballast port may advantageously be used to increase the speed of response during pressure set point changes, as well as active control of the chamber pressure in place of the gate valve. During operation, the ballast gas introduction may precisely control the pressure in the chamber over a substantial range of operating pressures, advantageously reducing the need for gate valve position changes. According to the present invention, the gate valve may be positioned in a few predetermined fixed positions, thereby extending the range of control by the ballast gas over the entire operating range of reaction chamber pressures. For example, it has been found in certain machines manufactured by Lam Research Corporation that using the ballast gas in combination with positioning the gate valve in three different positions, fully open, two-thirds closed, and fully closed, provides coverage of an adequate range of conductances for the evacuation system.

Thus, according to the present invention, a ballast gas may advantageously be introduced via a ballast port directly into or immediately upstream from the turbo pump, thereby effectively controlling the pressure of the reaction chamber without the need for adjusting the process gas inflow rate, or adjustments to the turbo pumping speed, and minimizing the amount of required movement of the gate valve. By minimizing the movement of the gate valve, the amount of particulate matter introduced and the chances of particulate contamination of the process are greatly reduced.

Figure 5:
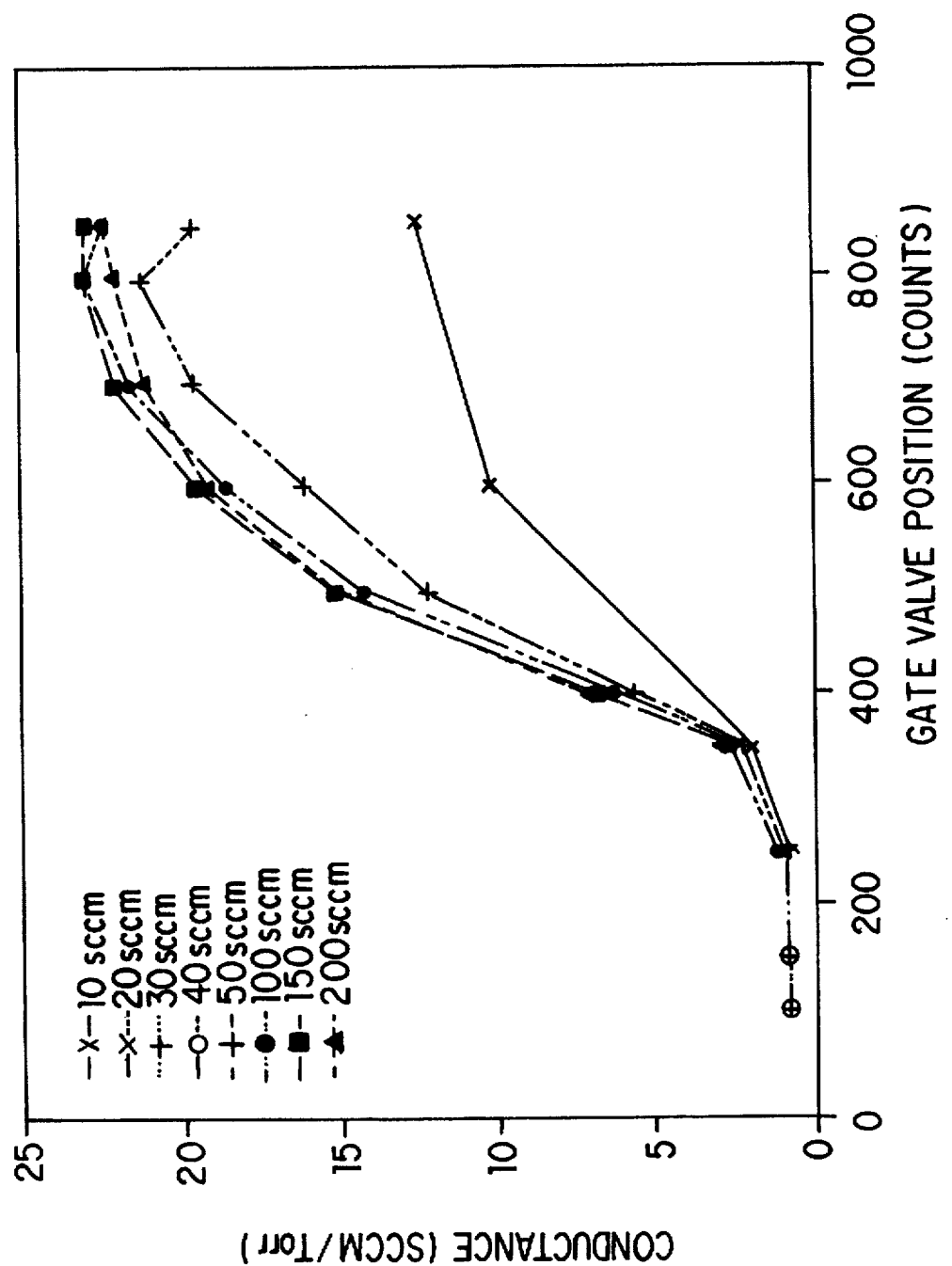
FIG. 5 is a graph illustrating examples of gate valve position estimation curves according to the present invention.

According to the present invention, a number of conductance curves may be used to estimate the position of the gate valve for a given flow rate and pressure set point, thereby eliminating the need for performing a learn procedure whenever a change in set point pressure or flow is made for a particular step or whenever a new recipe is used. FIG. 5 illustrates examples of such gate valve estimation curves. In particular, a family of curves is shown, for various flow rates. It has been found that the curves tend to converge at high flow rates; in the case of FIG. 5, the curves tend to converge at flow rates above 100 SCCM.

According to the invention, the preferred method of deriving the gate position estimation curves is as follows. For each flow rate, step through a sequence of gate valve positions and measure the resultant pressure for each position. The flow rate divided by the pressure measured is the conductance for that gate valve position. Repeat this process for each flow rate. It has been found that once the gate position estimation curves are derived, they remain accurate absent some drastic change in the turbo pump or the gate valve. Thus, according to the invention, the curves may be permanently stored in the memory of the control system. In FIG. 4, memory 190 is shown as part of pressure controller 160 and is preferably used to store the gate position estimation curves. For example, the curves may be stored in memory 190 in the form of a matrix or array of values, or in the form of formulas or functions which have been fitted to the experimentally derived curves.

Gate valves and controllers currently available typically operate in either pressure control mode or position control mode. In pressure control mode the controller monitors the pressure in the chamber and tries to adjust the position of the gate valve to maintain the set pressure, while in position control mode the controller simply positions the gate valve to the set position. It has been found according to the invention, that the gate valve should be operated initially in position control mode, with the position set point estimated from the gate position estimation curves stored in memory. For example, if the process set point is 20 mTorr pressure with 100 SCCM flow, the pressure controller estimates the gate position from the curve stored in memory. In the case of FIG. 5, the position would be approximately 380. When the pressure is within a small percentage of the set point, the pressure controller is preferably switched to pressure control mode. For example, it has been found in some machines that when pressure controller is switched to pressure control mode when the pressure is within 5% of the set point pressure, smooth coasting to the set point pressure generally occurs.

Thus, according to the present invention, use of gate position estimation curves stored in memory advantageously eliminates the need to perform a new learn procedure whenever the pressure or flow set points are substantially altered for any of the process steps or whenever a new process recipe is used. Additionally, use of the estimation curves avoids the undesirable result of a learn procedure which is conducted while any of the gas supply valves or instruments are incorrectly tuned or calibrated.

The gate valve position estimation curves may also be used when controlling the pressure using ballast gas. In order to cover a wider range of conductances, the gate valve may be set in a small number of preselected positions. The gate valve estimation curves may be used to select which gate valve position is best for a particular process step. In general for a system, a certain range of ballast flow is optimal for controlling the pressure in the reaction chamber. Assuming a ballast gas flow near the mid-point of the suitable range of ballast gas flow rates, adding that rate to the set point rate, and then dividing the combined flow rate by the set point pressure will yield a conductance value. This conductance value will indicate, when using the gate valve position estimation curves, which of the few preselected gate valve positions is appropriate. For example, suppose the range of ballast gas flow is 0-300 SCCM for a given configuration, the process gas flow set point is 50 SCCM, and chamber pressure set point is 15 mTorr. Then 150 SCCM, the middle of the range of ballast gas, added to the set point flow and divided by the pressure yields a conductance of about 13.3 SCCM/mTorr. Using the curves in FIG. 5, the ideal gate position would be about 500, and the nearest preselected position should be chosen. In the case of using three preselected gate positions, wide-open, fully closed, and two-thirds closed, the position of two-thirds closed would be chosen.

While preferred embodiments of the invention have been described, the descriptions are merely illustrative and are not intended to limit the present invention. For example it is to be understood that although the invention was described using an example of vacuum plasma wafer processing equipment, the invention is applicable to other types of wafer processing equipment as well as to other types of vacuum processing equipment. Thus, one of ordinary skill will recognize that the invention is equally applicable to other types of equipment where there is a need to manipulate and precisely control low, near-vacuum pressure in an evacuated chamber.

We claim:

1. A method for controlling pressure in an evacuated processing chamber comprising the steps of:

introducing process gas into the processing chamber;

removing gas from the processing chamber using an evacuation system, said evacuation system comprising a vacuum pump communicating with the processing chamber via a moveable throttle valve;

moving the throttle valve to alter the conductance of the evacuation system;

measuring pressure in the processing chamber;

introducing ballast gas into the evacuation system; and actively controlling the rate of gas removal from the processing chamber in part by adjusting the flow of ballast gas introduced into the evacuation system in response to measurements of the pressure in the processing chamber, said ballast gas altering the rate of gas removal without altering the conductance of the evacuation system.

2. The method of claim 1 wherein the step of introducing comprises introducing the flow of ballast gas directly into the vacuum pump.

3. The method of claim 1 wherein the step of introducing comprises introducing the flow of ballast gas directly into the evacuation system on the upstream side of the throttle valve.

4. The method of claim 1 further comprising the step of positioning the throttle valve to a predetermined position, the predetermined position being selected by referring to a correlation between the flow of gas into the evacuation system the pressure in the processing chamber and the position of the throttle valve, the correlation being stored in a memory.

5. The method of claim 1 wherein said step of introducing process gas comprises:
 introducing the process gas into the processing chamber at a first predetermined flow rate; and
 decreasing the rate of flow of the introduced process gas to a second predetermined flow rate in response to a measured pressure in the process chamber, the second predetermined flow rate substantially equal to a pressure level preselected for a process step and lower than the first predetermined flow rate.

6. The method of claim 1 wherein said step of introducing process gas comprises:
 introducing the process gas into the processing chamber at a first predetermined flow rate; and
 decreasing the rate of flow of the introduced process gas to a second predetermined flow rate after a predetermined amount of time, the second predetermined flow rate substantially equal to a pressure level preselected for a process step and lower than the first predetermined flow rate.

7. An apparatus for processing materials under a controlled low pressure comprising:
 a processing chamber;
 a pressure meter communicating with said processing chamber and configured to measure the pressure in said processing chamber;
 a process gas introduction system communicating with said processing chamber and configured to introduce process gas into said processing chamber;
 an evacuation system communicating with said processing chamber and configured to remove gas from said processing chamber, said evacuation system comprising a vacuum pump communicating with the processing chamber via a moveable throttle valve, said throttle valve configured to alter the conductance of said evacuation system; and
 a ballast gas introduction system communicating with said evacuation system, configured to introduce ballast gas directly into said evacuation system in response to measurements from said pressure meter, said ballast gas altering the rate of gas removal without altering the conductance of the evacuation system.

8. The apparatus of claim 7 wherein said ballast gas introduction system is positioned and configured to introduce ballast gas directly into said evacuation system at a location upstream from said throttle valve.

9. The apparatus of claim 7 wherein said ballast gas introduction system is positioned and configured to introduce gas into said evacuation system directly into said vacuum pump.

10. The apparatus of claim 7 wherein said throttle valve is set at a predetermined position, the predetermined position is selected from one of three positions including a closed position, and a two different open positions.

11. The apparatus of claim 7 wherein the process gas introduction system is further configured to introduce gas at a first flow rate during the beginning of a process step and at a reduced flow rate later in the process step.

12. A method for controlling pressure in an evacuated processing chamber comprising the steps of:
 positioning a throttle valve at a predetermined position, the throttle valve used to control pressure in the processing chamber;
 introducing gas into the processing chamber at a predetermined rate;
 measuring pressure in the processing chamber;
 repeating said steps of positioning, introducing, and measuring;
 deriving a mathematical function having a domain comprising the rate of gas introduction into the processing chamber, and the pressure in the processing chamber, and having a range comprising the position of the throttle valve, said mathematical function being derived from the measured pressure values and said steps of positioning and introducing;
 storing the mathematical function in a memory; and
 positioning the throttle valve according to the mathematical function by applying a desired pressure value and a desired flow value to the mathematical function.

13. A method for controlling pressure in an evacuated processing chamber comprising the steps of:
 retrieving from electronic memory a desired pressure value reflecting a desired pressure level for the processing chamber;
 retrieving from electronic memory a desired gas flow value representing a desired gas flow rate through the processing chamber;
 accessing from electronic memory a mathematical function having a domain comprising pressures in the processing chamber, and gas flow rates into the processing chamber, and having a range comprising positions of a throttle valve, the throttle valve used for regulating pressure in the processing chamber; and
 positioning the throttle valve according to the mathematical function by applying the desired pressure value and the desired flow value to the mathematical function accessed from electronic memory.

14. The method of claim 13 wherein the mathematical function is stored in memory in the form of a table of values.

15. The method of claim 13 further comprising the steps of:
 introducing process gas into the processing chamber at a first flow rate, the first flow rate being substantially higher than the desired gas flow rate; and
 reducing the rate of introduction of process gas into the processing chamber to the desired gas flow rate.

16. The method of claim 15 further comprising the step of measuring the pressure in the processing chamber, wherein said step of reducing the rate of introduction occurs in response to a measured pressure level in the processing chamber being substantially equal to the desired pressure level.

17. The method of claim 15 wherein said step of reducing the rate of introduction occurs after a predetermined amount of time.

18. An apparatus for processing materials under a controlled low pressure comprising:

a processing chamber;

a gas introduction system communicating with said processing chamber configured to introduce process gas into said processing chamber;

a vacuum pump communicating with said processing chamber configured to remove gas from said processing chamber;

a throttle valve mounted between said processing chamber and said vacuum pump, said throttle valve positionable to regulate the rate of gas removed from said processing chamber by said vacuum pump;

a memory storing a mathematical function having a domain comprising the flow rate of gas into the processing chamber, and the pressure in the processing chamber, and having a range comprising the position of the throttle valve; and a controller for controlling the pressure in said processing chamber by directing the throttle valve to a throttle position selected by said controller, wherein the throttle position is selected by applying a desired pressure in the processing chamber and a desired flow rate of process gas to the mathematical function stored in said memory.

19. The apparatus of claim 18 wherein the mathematical function is stored in said memory in the form of a table of values.

20. The apparatus of claim 18 wherein said gas introduction system introduces gas initially at a first predetermined rate, and thereafter reduces the rate of introduction to a second predetermined rate which is substantially equal to the desired flow rate.

21. A method for controlling pressure in an evacuated processing chamber comprising the steps of:

introducing process gas into the process chamber at a first predetermined flow rate, the process gas to be used in the processing of semiconductor materials;

decreasing the rate of flow of the introduced process gas to a second predetermined flow rate which is lower than the first predetermined flow rate;

evacuating gas from the processing chamber using an evacuation system, the evacuation system comprising a vacuum pump communicating with the processing chamber via a throttle valve;

measuring the pressure in the processing chamber;

introducing ballast gas directly into the evacuation system;

positioning the throttle valve at a predetermined position, the predetermined position being selected by referring to a mathematical function having a domain comprising pressures in the processing chamber, and gas flow rates into the processing chamber, and having a range comprising positions of the throttle valve, the mathematical function being stored in a memory; and actively controlling the rate of gas evacuation from the processing chamber in part by adjusting the flow of ballast gas introduced into the evacuation system in response to measurements of the pressure in the processing chamber, said ballast gas altering the rate of gas removal without altering the conductance of the evacuation system.

* * * * *